United States Patent [19]

Ketzer

[11] 4,231,504
[45] Nov. 4, 1980

[54] ADJUSTING MECHANISM FOR A TAPE RECORDER CAPSTAN

[75] Inventor: Manfred Ketzer, Vienna, Austria

[73] Assignee: U.S. Philips Corporation, New York, N.Y.

[21] Appl. No.: 41,672

[22] Filed: May 23, 1979

[30] Foreign Application Priority Data

Jun. 9, 1978 [AT] Austria .................................. 422478

[51] Int. Cl.³ .......................................... B65H 17/22
[52] U.S. Cl. .................................... 226/180; 226/194; 242/206
[58] Field of Search ....................... 226/180, 190, 194; 242/201–206, 208, 210

[56] References Cited

U.S. PATENT DOCUMENTS

| 3,257,056 | 6/1966 | Cederberg et al. | 226/176 |
| 3,278,099 | 10/1966 | Wada | 226/181 |
| 3,372,850 | 3/1968 | Hipelius et al. | 226/180 |
| 3,441,188 | 4/1969 | May et al. | 226/180 |
| 3,949,919 | 4/1976 | Takei | 226/194 |

Primary Examiner—Leonard D. Christian
Attorney, Agent, or Firm—David R. Treacy

[57] ABSTRACT

A recording and/or reproducing apparatus with a capstan rotatably journalled in two bearings, at least one of the two bearings being movable by an adjusting device so as to adjust the angular position of the capstan. The apparatus has a straight-line guide, along which the adjustable bearing is movable; and the adjusting device is constituted by a movable control slide which has a sliding surface which moves the bearing along the guide when the control slide is moved.

5 Claims, 2 Drawing Figures

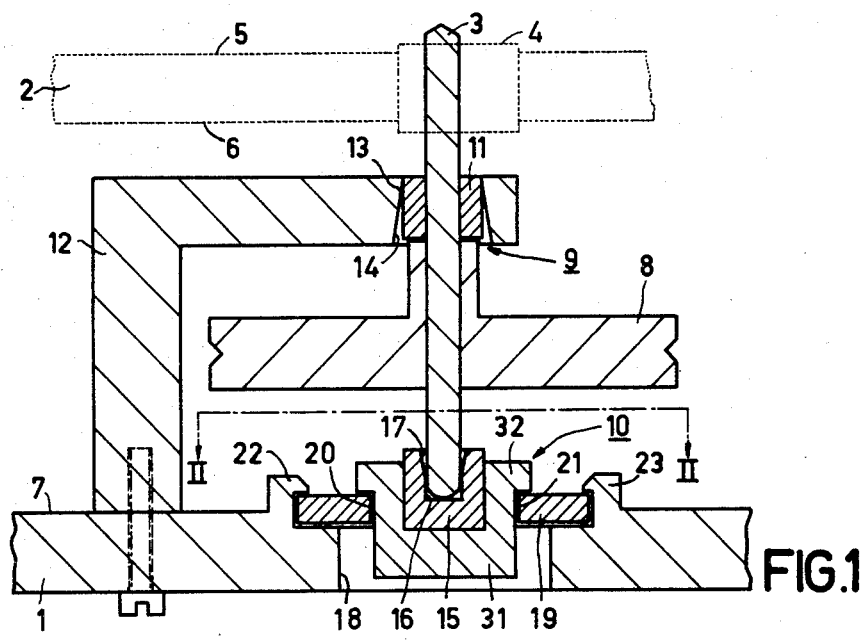
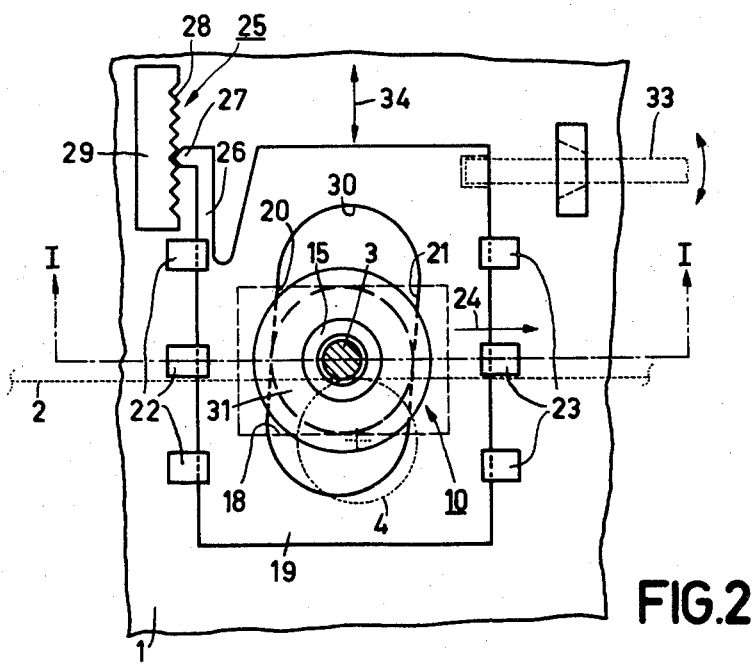
FIG.1
FIG.2

ADJUSTING MECHANISM FOR A TAPE RECORDER CAPSTAN

BACKGROUND OF THE INVENTION

The invention relates to a recording and/or reproducing apparatus for a record carrier in the form of a tape, and in particular to such an apparatus having a drive shaft or capstan for the transport of the record carrier. Such a shaft or captan is rotatably journalled in two bearings which are spaced from each other in the longitudinal direction of the drive shaft and enable the drive shaft to be pivoted so as to adjust the angular position of said shaft relative to a reference surface, at least one of the two bearings being movable by means of an adjusting device. Such apparatus is for example known from the German Auslegeschrift No. 11 40 737, in which apparatus the adjusting device is constituted by an eccentric member, which can be fixed in the desired adjusting position by means of screws.

Adjusting the angular position of the drive shaft relative to the reference surface is necessary, in order to position the drive shaft in such a way that it exerts such a force on the record carrier which is moved by it, for example as a result of pressure against a pressure roller, that the record carrier during its transport is moved exactly in a predetermined direction. This accuracy of movement is of particular importance in such apparatus. In the known apparatus the device for adjusting the angular position of the drive shaft relative to the reference surface is comparatively complicated and adjustment demands a comparatively intricate operation.

SUMMARY OF THE INVENTION

It is the object of the invention to eliminate these drawbacks, and to provide an apparatus with a simple and reliable device for adjusting the angular position of the drive shaft.

According to the invention, the apparatus comprises a guide (preferably straight) along which the bearing is movable; and the adjusting device is constituted by a movable control slide, which comprises at least one sliding surface which makes an acute angle with the direction of guiding, and which moves the bearing along the guide for adjusting the drive-shaft position when the control slide is moved. In this way a particularly simple yet very reliable device for adjusting the angular position of the drive shaft relative to the reference surface is realized. Such a device ensures that during an adjusting operation the movable bearing is retained by the guide and the sliding surface, so that an inadvertent adjustment of the drive shaft, which could lead to deformation or damage to the shaft, is prevented. In addition, there is the advantage that an exact adjustment of the angular position of the drive shaft is particularly simple, because this is possible by simply moving the control slide.

It is found to be advantageous if the direction of the straight-line guide substantially corresponds to the direction of the record carrier which moves towards the drive shaft. This provides a very sensitive adjustment, because it appears that when the angular position of the drive shaft is adjusted in the direction in which the record carrier moves towards said shaft the influence on the direction of transport of the record carrier is particularly great.

According to a further preferred embodiment the angle between the direction of the straight-line guide and the sliding surface of the slide is approximately 85°. This enables a very fine adjustment of the angular position of the drive shaft to be obtained, because a comparatively large travel of the control slide causes only a slight movement of the bearing. Furthermore, at such an angle the parts which are adjustable relative to each other are self-locking, so that an inadvertent change of the adjustment of the slide and thus of the drive shaft is avoided and forces which act on the drive shaft during record carrier transport cannot influence its adjustment. In this respect it is furthermore found to be advantageous if the control slide can be latched in a plurality of positions by means of a latching device. In this way it is ensured that the adjustment of the control slide is also retained when it is subject to shocks and the like.

In yet another preferred embodiment both the straight-line guide and the sliding surface of the control slide are each constituted by a slotted hole and that the movable bearing comprises a cylindrical sliding portion, which extends through the two slotted holes. In this way a particularly simple compact construction is realized.

The invention will now be described in more detail with reference to the drawing which shows an embodiment to which the invention is not limited.

BRIEF DESCRIPTION OF THE DRAWING

FIG. 1 is an axial cross-section through the drive shaft of a recording and/or reproducing apparatus for a record carrier in the form of a tape, a pivot bearing of the drive shaft being movable with a control slide so as to adjust its angular position.

FIG. 2 is a cross-section taken on the line II—II in FIG. 1.

DESCRIPTION OF THE PREFERRED EMBODIMENTS

In FIGS. 1 and 2 the reference numeral 1 designates a chassis of recording and/or reproducing apparatus for a tape-like record carrier 2, which in the figures is schematically represented by dotted lines. For the transport of the record carrier 2 the apparatus comprises a capstan or drive shaft 3 which engages the record carrier, against which shaft the record carrier is pressed during its transport by the pressure roller 4, which is also shown dotted. In such apparatus the direction of transport of the record carrier which is moved by the drive shaft is particularly critical, which is the reason why the angular position of the drive shaft is adjustable so as to obtain the desired direction of transport. As can be seen in FIG. 1, the direction of transport of the record carrier 2 in the present example has been selected so that at the location of the drive shaft 3 the two edges 5 and 6 of the record carrier 2 extend essentially parallel to a reference surface constituted by the deck surface 7 of the chassis 1. For rotary drive of the drive shaft 3, this shaft is rigidly connected to a pulley 8, which is drivable by means of a belt in a manner not shown.

The drive shaft 3 is rotatably journalled in two bearings 9 and 10 which are spaced from each other in the longitudinal direction of the shaft. The bearing 9 has a cylindrical bearing sleeve 11, which is mounted in a bore 13 formed in a bearing block 12 which is connected to the chassis, which bore has a portion 14 which widens conically in the direction of the other bearing 10. The bearing 10, which takes the form of a pivot bearing for the drive shaft 3, has a cylindrical cup-shaped bearing sleeve 15, which also has a cylindrical bore 16 with a portion 17 which widens conically in the direction of the other bearing 9. The two conical portions 14 and 17 ensure that the drive shaft is pivotable, and thus permit adjusting the angular position of the drive shaft relative to the reference surface 7.

In order to enable such an adjustment of the angular position of the drive shaft 3, the position of the bearing 10 in the present embodiment is adjustable relative to the chassis 1 by means of an adjusting device. The apparatus comprises a straight-line guide 18 in which the bearing 10 is movable. The adjusting device is constituted by a control slide 19, which is guided so as to be movable in a direction perpendicular to the direction of the guide 18, and which includes two sliding surfaces 20 and 21 which are arranged at an acute angle with the direction of the guide 18. The guide 18 and slide 19 cooperate to move the movable bearing 10 in the guide 18 when the slide 19 is moved. The guide 18 is formed directly in the chassis 1 of the apparatus and the slide 19 is retained and guided by means of guide hooks 22 and 23 which project from the chassis. The direction of the straight-line guide 18, which is indicated by the arrow 24 in FIG. 2, essentially corresponds to the direction of the record carrier 2 when it moves towards the drive shaft 3. As is furthermore shown in FIG. 2, the angle between the direction of the guide 18 and the sliding surfaces 20 and 21, which are inclined relative thereto, is approximately 85°.

In order to ensure that the slide 19 is fixed in its selected position a latching device 25 having a plurality of latching positions is provided. This latching device 25 comprises an arm 26 which is elastically connected to the slide 19 and which comprises a hook-shaped end, which is engageable with a toothing 28 on a projection 29 of the chassis 1 of the apparatus.

As can be seen in the Figures, the straight-line guide 18 is formed by a slotted hole in the chassis 1 and the sliding surfaces 20 and 21 of the slide 19 are formed by the side walls of a slotted hole 30 in the slide 19. The bearing 10 has a cylindrical sliding portion 31, in which the cup-shaped bearing sleeve 15 is mounted so as to be non-rotatable. This sliding portion 31 extends through the two slotted holes 18 and 30, engaging the side walls of the slotted hole 18 which constitute a straight-line guide and with the side walls of the slotted hole 30 which constitute the sliding surfaces 20 and 21. Furthermore, the sliding portion 31 has a cylindrical rim of larger diameter, with which it bears on the slide 19.

For adjusting the angular position of the drive shaft 3 relative to the reference surface 7 the control slide 19, which is movable perpendicularly to the guide 18, is moved in the direction of the double arrow 34, for example by means of a tool 33, shown dotted in FIG. 2, which bears on the chassis 1 and which engages the slide, the hook-shaped end 27 of the arm 26 on the slide 19 passing along a row of teeth 28. The sliding surfaces 20 and 21, which enclose an angle of approximately 85° with the direction of the guide 18, move the sliding portion 31 and thus the bearing 10 along the guide 18, the direction of the guide 18 determining the direction in which the bearing 10 is moved. Thus the position of the bearing 10 relative to the stationary bearing 9 is variable, the drive shaft 3 being pivoted in the direction of the guide 18.

By means of this simple adjusting procedure the transport of the record carrier 2 by the drive shaft 3 can be influenced. Because in this embodiment the pivotal movement of the drive shaft 3 in the direction of the guide 18 is performed in the direction of the record carrier 2 when it moves towards the drive shaft, a substantial influence on the direction of transport of the record carrier is found to be attainable with slight variations in the angular position of the drive shaft 3. The adjustment of the angular position of the drive shaft described in the foregoing ensures that the transport of the record carrier 2 by the drive shaft takes place in the desired predetermined direction with great accuracy, which is of particular importance for a correct operation of such equipment. As stated, the direction of transport of the record carrier 2 in the present example is selected so, by a corresponding adjustment of the angular position of the drive shaft 3, that the two edges 5 and 6 of the record carrier 2 always extend parallel to the reference surface constituted by the deck surface 7 of the chassis 1. Determining the correct transport of the record carrier may for example be effected with the aid of an optical detection or measuring device.

In this way a recording and/or reproducing apparatus with a simple compact and reliable device for adjusting the angular position of the drive shaft is obtained, which excels in simplicity of a particularly simple operation. Because of the choice of the angle between the sliding surfaces 20, 21 of the control slide 19 and the direction of the guide 18, a very fine adjustment is possible. Furthermore, this angle ensures that a self-locking action is obtained between the sliding surfaces 20, 21 and the sliding portion 31, so that for example forces exerted on the drive shaft 3 during transport of the record carrier 2 have substantially no influence on the adjustment of the movable bearing 10 and thus on the angular position of the drive shaft 3. Moreover, there is no reaction on the control slide 19 itself, so that the latching device 25 for said slide can be adjusted smoothly. This is of advantage when adjusting the slide because in that case the latching device need not be released separately. The choice of the direction of the guide has the previously mentioned advantage of a particularly high adjustment sensitivity.

It is obvious that there are still further alternative constructions for the guide and the control slide. As an example the control slide may comprise only one sliding surface, the bearing cooperating with the sliding surface for example under the influence of a spring. Moreover, the control slide may be arranged at an angle relative to the deck surface of the chassis and may be adjustable. Similarly, the angle between the guide and the sliding surface may differ from that in the previously described embodiment. Instead of the pivot bearing 10 the other bearing 9 for the drive shaft may be adjustable, and it is alternatively possible to make both bearings adjustable; further different adjusting directions may be provided for the two bearings. Alternatively a clamping device for the control slide may be provided, by means of which device the slide may be clamped in any desired position.

What is claimed is:

1. A recording and/or playback apparatus for a record carrier in the form of a tape, comprising a drive shaft rotatable about a longitudinal direction for transport of a tape; two bearings spaced apart from each other in the longitudinal direction of the shaft, in which the shaft is rotatably journalled; and means for mounting the bearings arranged to permit pivoting of the shaft longitudinal direction and for adjusting the angular position of the shaft relative to a reference surface, said means including an adjusting device for moving at least one of the bearings, wherein the apparatus includes a guide along which said at least one bearing is movable in a direction of guiding, and said device comprises a movable control slide having at least one sliding surface arranged at an acute angle with respect to said direction of guiding, said slide moving said at least one bearing along the guide as the slide is moved.

2. An apparatus as claimed in claim 1, wherein said guide is a straight-line guide, said at least one bearing being movable in a straight line parallel to the direction of record carrier movement as it is transported toward the drive shaft.

3. An apparatus as claimed in claim 1, wherein said guide is a slotted hole having straight parallel side walls; said sliding surface is a side wall of a slotted hole having straight parallel side walls; and said movable bearing has a cylindrical portion extending through said holes for sliding engagement with said side walls.

4. An apparatus as claimed in claim 1, 2 or 3 wherein said acute angle is approximately 85°.

5. An apparatus as claimed in claim 1, 2 or 3 comprising in addition means for latching the control slide in a selected one of a plurality of positions.

* * * * *